(No Model.) 6 Sheets—Sheet 1.
G. KREMENTZ.
MACHINE FOR MAKING COLLAR BUTTONS.
No. 372,683. Patented Nov. 8, 1887.

*fig. 1.*

WITNESSES:
A. Schehl.
Carl Karp

INVENTOR
George Krementz
BY
Krementz & Regener
ATTORNEYS (No Model.)  6 Sheets—Sheet 2.

G. KREMENTZ.
MACHINE FOR MAKING COLLAR BUTTONS.

No. 372,683. Patented Nov. 8, 1887.

WITNESSES:
A. Schehl
Carl Kay

INVENTOR
George Krementz
BY
Goepel & Raegener
ATTORNEYS.

(No Model.) 6 Sheets—Sheet 4.

G. KREMENTZ.
MACHINE FOR MAKING COLLAR BUTTONS.

No. 372,683. Patented Nov. 8, 1887.

WITNESSES:
A. Schehl.
Carl Hays

INVENTOR
George Krementz
BY
Goepel & Raegener
ATTORNEYS.

N. PETERS, Photo-Lithographer, Washington, D. C.

(No Model.) 6 Sheets—Sheet 5.

G. KREMENTZ.
MACHINE FOR MAKING COLLAR BUTTONS.

No. 372,683. Patented Nov. 8, 1887.

WITNESSES:
A. Schehl,
Carl Karp

INVENTOR
George Krementz
BY
Jacques Raegener
ATTORNEYS.

N. PETERS, Photo-Lithographer, Washington, D. C.

UNITED STATES PATENT OFFICE.

GEORGE KREMENTZ, OF NEWARK, NEW JERSEY.

MACHINE FOR MAKING COLLAR-BUTTONS.

SPECIFICATION forming part of Letters Patent No. 372,683, dated November 8, 1887.

Application filed December 10, 1886. Serial No. 221,164. (No model.)

*To all whom it may concern:*

Be it known that I, GEORGE KREMENTZ, of Newark, in the county of Essex and State of New Jersey, have invented certain new and useful Improvements in Machines for Making Collar-Buttons, of which the following is a specification.

This invention relates to a new and improved machine for making the collar-buttons for which Letters Patent of the United States were granted to me under date of the 6th day of May, 1884, No. 298,303, and other similar collar-buttons or parts thereof.

The invention consists in the combination, with a series of dies for drawing in the button-blanks, of rotating rods for rotating the buttons or blanks during the time that they are being drawn and mechanism for shifting the button at regular intervals.

The invention also consists in the construction and combination of numerous parts and details, all as will be fully described and set forth hereinafter, and finally pointed out in the claims.

In the accompanying drawings, Fig. 2 is a rear view of the same. Fig. 8 is a longitudinal sectional view of the same.

Similar letters of reference indicate corresponding parts.

In the upper part of the frame A of the machine the shaft A' is journaled, and on the same the disks B and B' are mounted eccentrically on the front and back of the machine, respectively, which disks are surrounded by straps or bands connected with rods. At the front of the machine the rod B² is connected with the eccentric, and to the lower end of said rod B² the reciprocating cross-piece or hammer C is pivoted, which is guided between the guides C' on the front of the machine. To the said cross-piece or hammer C the upper die is fastened, which will be described hereinafter.

Figure 3:
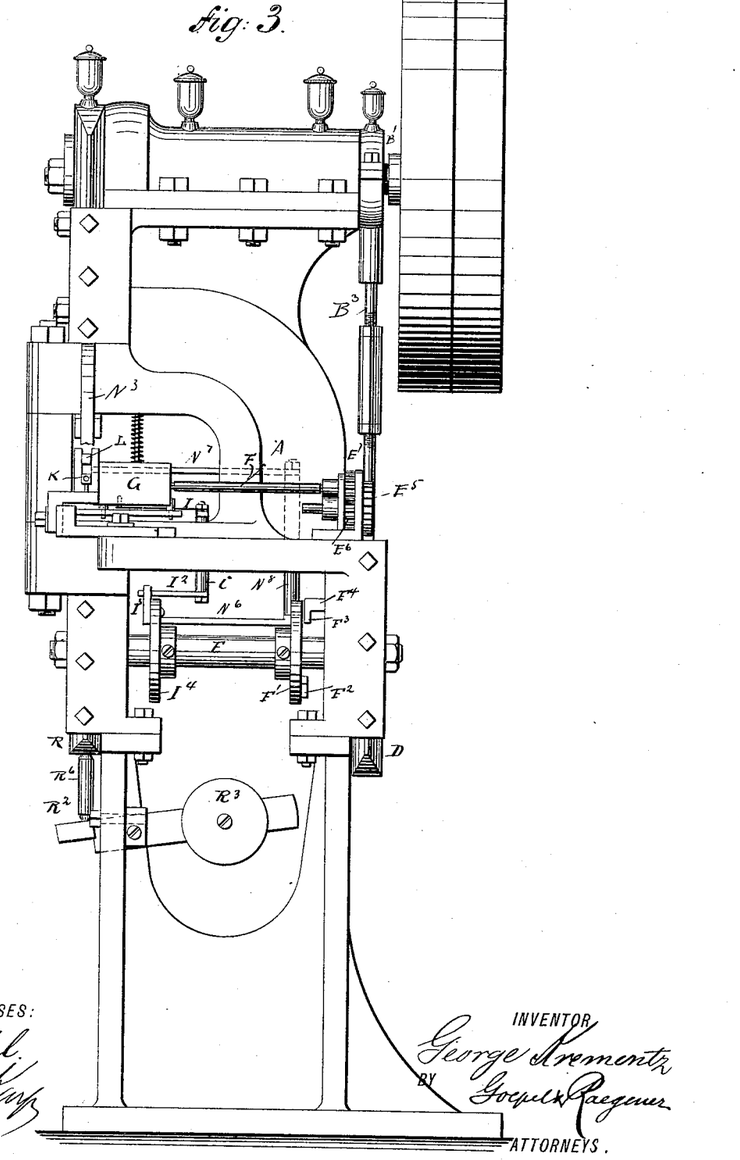
Fig. 3 is a side view of the same.
Figure 4:
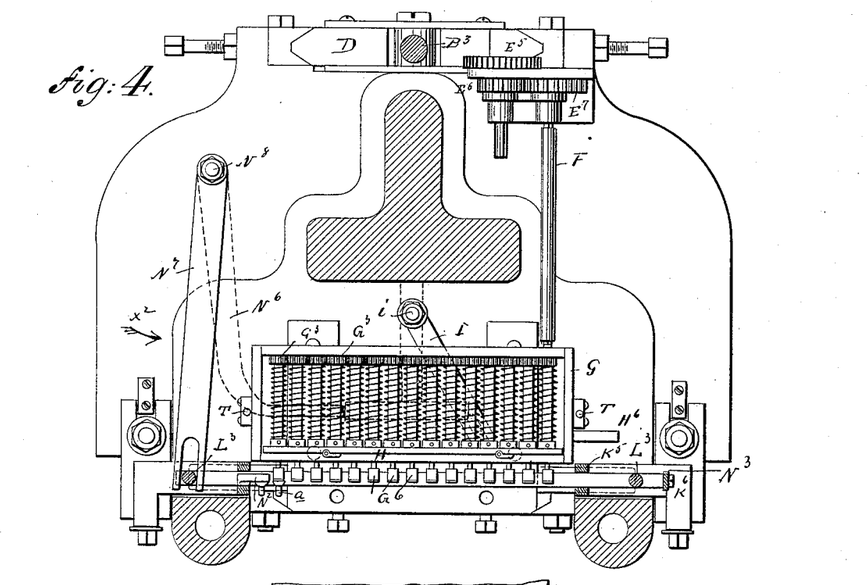
Fig. 4 is a sectional plan view, on an enlarged scale, showing the devices for rotating the blanks, the bars for shifting them, and the mechanism for operating the blank-rotaters and other parts.

On the rear end of the machine the rod B³ is connected with the strap around the eccentric B', and the lower end of said rod B³ is connected with a frame, D, mounted to reciprocate vertically between the guides D', the said frame D being provided with a recess or opening, D², into which one end of the shaft E projects, said shaft being journaled in bearings of the frame of the machine, as shown in Fig. 3. In the recess D² a ratchet-wheel, E', is mounted on the shaft E, with which a pawl, E², engages, acted upon by a spring and pivoted to the vertically-reciprocating frame D. A suitable check-pawl, E³, engages with the ratchet-wheel and is pivoted to the frame of the machine. In the top of the reciprocating frame D a pawl, E⁴, is pivoted, which acts on and revolves a ratchet-wheel, E⁵, united with a cog-wheel, E⁶, engaged with the cog-wheel E⁷, mounted on a squared shaft inserted in one end of a tubular shaft, F, Fig. 4. A suitable locking-pawl is engaged with the ratchet-wheel E⁵. On the shaft E a disk, F', is mounted, which is provided on one face with a projection, F², which can act on the arm $F^3$ on one end of a shaft, $F^4$, pivoted in the frame of the machine and provided on the opposite end with an arm, $F^5$, adjacent to the lower end of the pawl $E^4$, Fig. 2.

Figure 8:
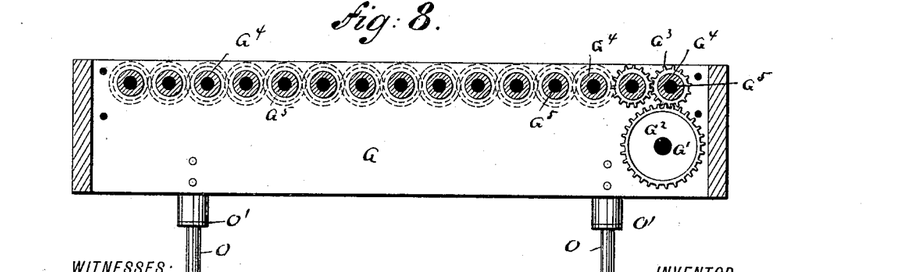

As stated, one end of the shaft F is held on the square end of the shaft on which the cog-wheel $E^7$ is mounted, and into the other or front end of the shaft the squared end of a shaft, $G'$, is passed, said shaft being journaled in a box or frame, G. On the shaft $G'$ the cog-wheel $G^2$ is mounted, and is engaged with a pinion, $G^3$, mounted rigidly on a sleeve, $G^4$, in which a rod, $G^5$, is mounted to reciprocate or slide. A series of rods, $G^5$, and surrounding sleeves or tubes $G^4$ are mounted parallel and transversely in the frame G, the pinions $G^3$ of the several sleeves $G^4$ being engaged, as shown in Fig. 8. The ends of the rods $G^5$, projecting from the front of the casing, are each provided with a head or cap, $G^6$, having a recess closed by a rubber head or disk, $G^7$. The several sleeves $G^4$ also pass through a bar, H, resting against the inner surface of the front of the box G and mounted at its ends on transverse rods $H'$ of the box G, so as to adapt said bar H to slide transversely to the length of the box. Said bar H also rests against cam-arms $H^2$, fixed on shafts $H^3$ in recesses in the rear surface of the front of the box G, said shafts $H^3$ being provided with arms $H^4$, resting between pins $H^5$ on a bar, $H^6$, guided in the ends of the box G to slide in the direction of the length of said box. The bar $H^6$ also has a downwardly-extending pin, $H^7$, passed through a slot in the free end of an arm, I, on the upper end of a shaft, $i$, mounted to turn on its longitudinal axis, and provided on its lower end, below the platform $A^2$, with an arm, $I^2$, on which a projection, $I^3$, of a disk, $I^4$, on the shaft E can act, as shown in Fig. 3.

Figure 9:
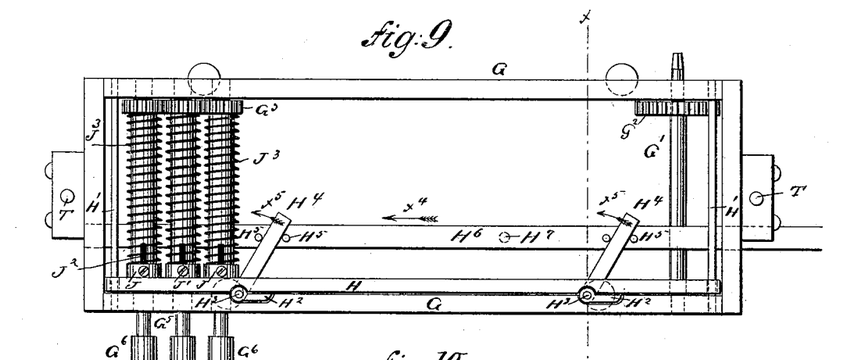
Fig. 9 is a plan view of the same, parts being omitted.
Figures 10, 13, 14, 15, 16:
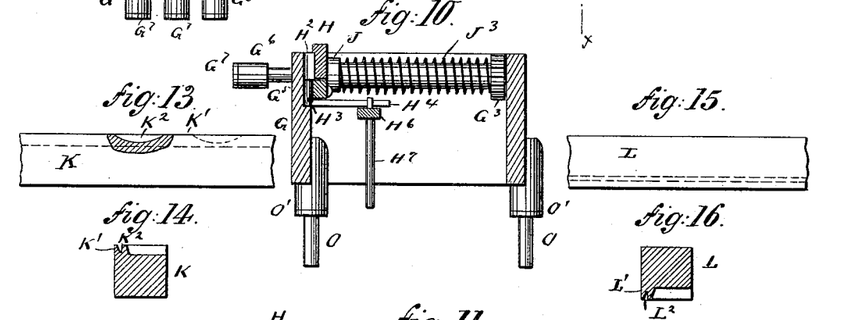
Fig. 10, a cross sectional view on the line *x x*, Fig. 9.
Fig. 13 is a face view of the bottom blank-shifting bar, parts being broken out and others being in section.
Fig. 14 is a cross-sectional view of the same.
Fig. 15 is a face view of the top blank-shifting bar, parts being broken off.
Fig. 16 is a cross-sectional view of the same.
Figure 11:
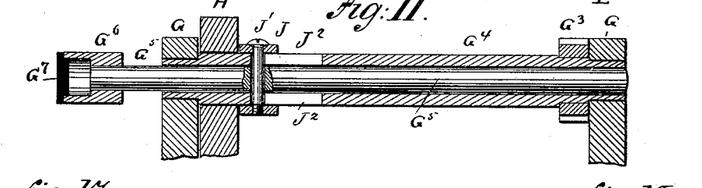
Fig. 11 is an enlarged detail longitudinal sectional view of one of the blank-rotators, parts being broken out.

As shown in Fig. 9, the cam projections $H^2$ rest in the recess in the rear surface of the box G, so as to permit the bar H to rest snugly against the rear side of the front of the box G. Each sleeve $G^4$ is surrounded, directly behind the bar H, by a collar, J, through which a screw, $J'$, passes, said screw also passing through the corresponding rod, $G^5$, and through the longitudinal slots $J^2$ of the sleeve $G^4$, which sleeve $G^4$ is surrounded by a spiral spring, $J^3$, one end of which rests against the pinion $G^3$ of the sleeve and the other end against the corresponding collar, J. When the bar $H^6$ is moved in the direction of the arrow $x^4$, Fig. 9, the bar H is pressed from the inner surface of the front of the box G by the cam-arms $H^2$, whereby the collars J are moved in a like direction, as are also the shafts $G^5$, connected with the collars J, and the springs $J^3$ are compressed.

In front of the box G two bars, K and L, are provided, of which the lower bar, K, is provided along the front with a rib, $K'$, on the top, said rib being provided with as many segmental notches $K^2$ as there are rods $G^5$ in the box G, the centers of the said notches being directly below the longitudinal axes of the rods $G^5$. The upper bar, L, is provided on its front, at the bottom, with a rib or ridge, $L'$, provided with a longitudinal groove, $L^2$, said groove $L^2$ being directly above the notches $K^2$.

Figure 5:
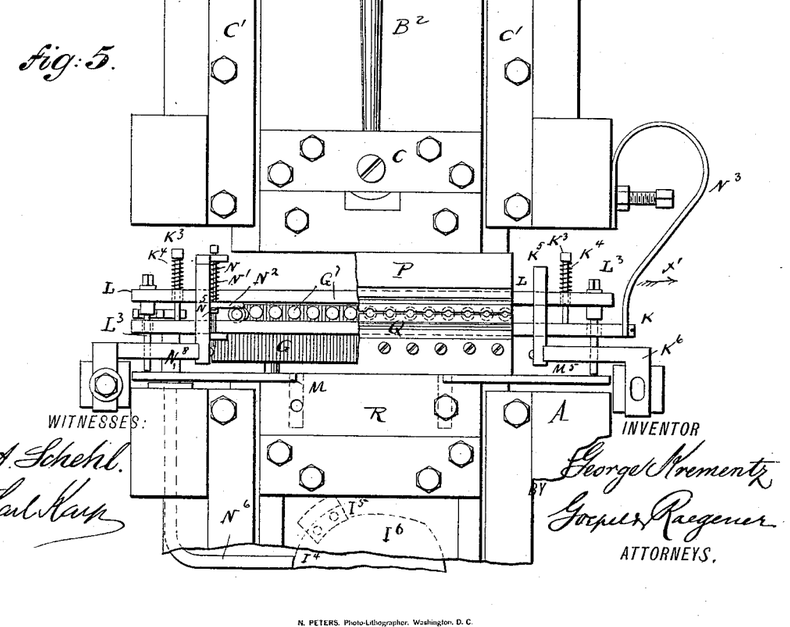
Fig. 5 is an enlarged detail front view of the blank-rotaters, blank-shifters, and parts for operating the same, parts being broken out.
Figure 6:
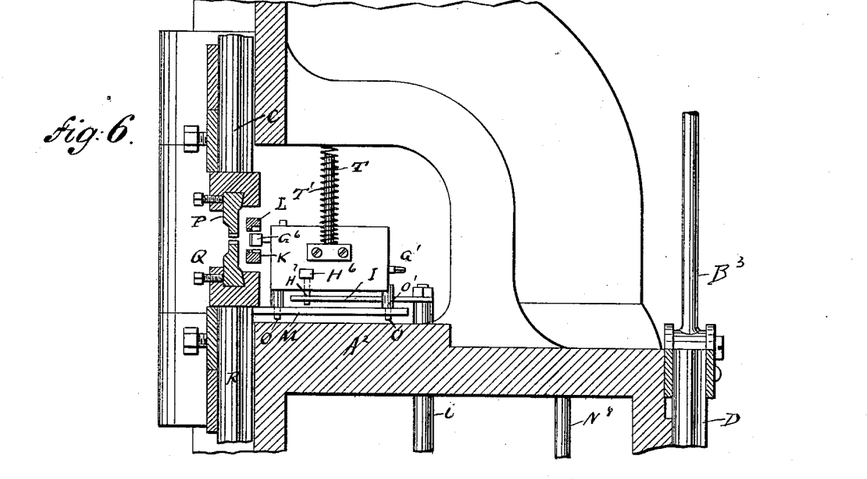
Fig. 6 is an enlarged longitudinal section of the middle part of the machine, showing the blank-shifters in section, the die-plates in section, and an end view of the frame containing the blank-rotators, also showing the parts for operating the blank-rotators.
Figure 7:
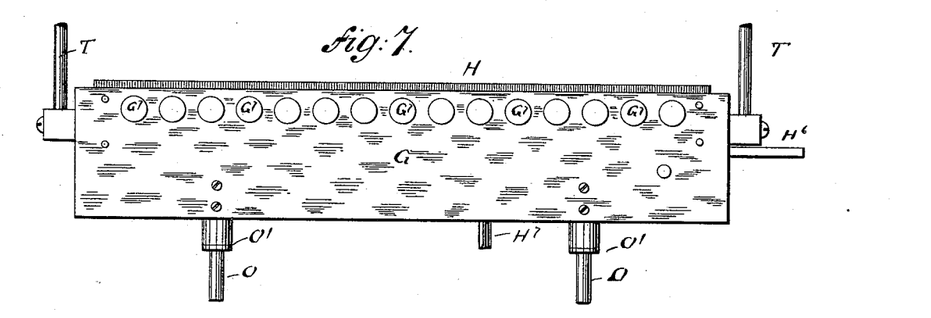
Fig. 7 is a front elevation, on an enlarged scale, of the box or frame containing the blank-rotators.

A U shaped plate, M, is fixed on top of a frame, R, to be described later, and is provided with two laterally-projecting wings, $M^5$. From the ends of the bar L pins $L^3$ project downward and rest on the ends of the wings $M^5$, said pins also passing through apertures in the bar K. From the bar K the pins $K^3$, having heads at their upper ends, pass through apertures in the bar L, springs $K^4$ surrounding said pins and pressing the bar L downward. The bar K rests on the bottoms of the slots in the supports $K^5$, projecting upward from arms $K^6$, held vertically adjustable on the frame A. On one of the standards $K^5$ the vertically-sliding pin N is pressed downward by the spring $N'$, surrounding it, said pin being provided with an arm, $N^2$, which projects over a part of the top edge of the bar K. A suitable stop, $N^5$, on the said support $K^5$ prevents the spring from pressing the arm $N^2$ down any farther than a short distance below the lower edge of the upper bar, L. A spring, $N^3$, is fastened to the frame A, and one end to the bar K, and draws said bar in the direction of the arrow $x'$, Fig. 5. An arm, $N^7$, having its free end notched, is fixed on the upper end of the shaft $N^8$, and one of the pins $L^3$ passes through the said notch. The shaft $N^8$ has a curved arm, $N^6$, on its lower end, one end of which arm $N^6$ rests against the rim of the disk $I^4$, mounted on the shaft E. The box G is provided with downwardly-projecting pins O, which pass through apertures in the U-shaped plate M, said pins O having shoulders or offsets $O'$, which rest on the top of said plate M.

Figure 1:
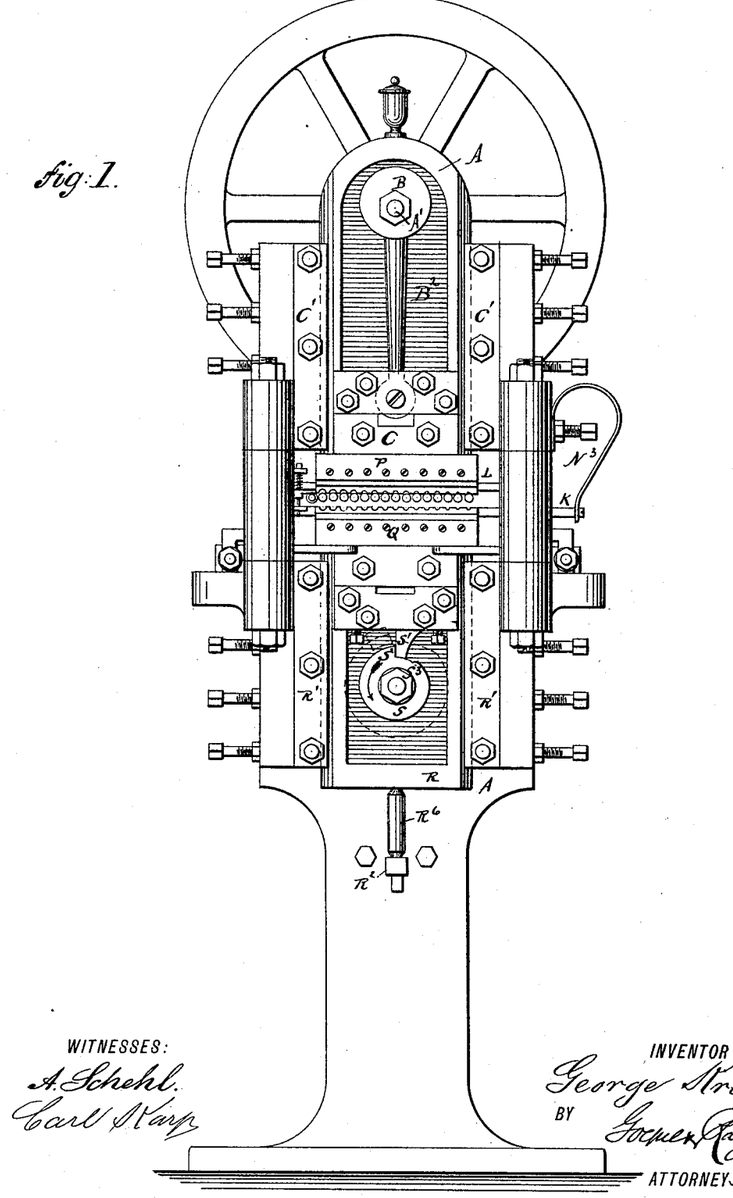
Figure 1 is a front elevation of my improved machine for making collar-buttons and like articles.

In front of the bars K and L the two die-plates P and Q are provided, the upper die-plate, P, being held on the reciprocating cross-piece or hammer C, previously mentioned, and the lower die-holder, Q, being held on a vertically-sliding frame, R, mounted to slide between the guides $R'$, said frame resting on a pin, $R^6$, on the front end of a lever, $R^2$, pivoted in the frame and provided with a balancing-weight, $R^3$. The frame R has a recess in which a cam-disk S, mounted on the front end of the shaft E, is located, and on the rim of said cam-disk an arm, $S'$, rests, which projects downward from the top piece of the frame R, as shown in Fig. 1. At the offset $S^2$ on the rim of the cam-disk S a notch, $S^3$, is formed, the functions of which will be described hereinafter.

The die-plates P and Q are provided in the edges facing each other with semicircular dies, which gradually decrease in diameter from the left to the right hand ends of the die-plates, as shown in Fig. 1. Pins T project upward from the ends of the box G and are surrounded by springs $T'$, which serve to press said box downward. The die-plates P and Q can easily be removed and replaced by others having notches of different size. Suitable driving-pulleys are provided on the shaft B.

Figures 12, 17, 18:
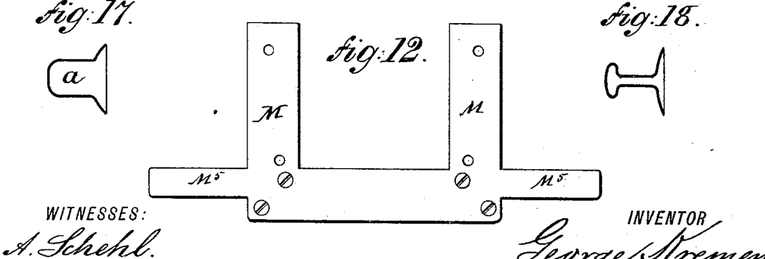
Fig. 12 is a plan view of the frame-plate carrying the blank-rotator box and blank-shifters.
Fig. 17 is a cross-sectional view of one of the blanks for forming a button.
Fig. 18 is a cross-sectional view of the button as it leaves the machine.

The operation is as follows: The blanks $a$, used for making the buttons, are shown in Fig. 17, and said blanks are inserted between the die-plates P and Q at the left-hand ends of the same, where the dies in the die-plates are largest. The upper dies reciprocate, and, acting on the blanks $a$, draw the same inward a short distance back from the closed end. The blank is then conducted to the next pair of dies to the right, which are slightly smaller than those in which the blank has just been located, and the metal of the blank $a$ is drawn in still farther, and so on, until the buttons finally have been in all the dies and leave the machine in the form shown in Fig. 18. From the shaft A the cross-piece C and the die-plate P on the same are reciprocated, and at the same time the frame D on the rear end of the machine is reciprocated, and at each upstroke of said frame D the ratchet-wheel E′ on the shaft E is revolved the distance of one tooth by the pawl $E^2$ on the frame D, and thus the cam-wheel S on the front end of the shaft E is revolved accordingly, and as it acts on the projection S′ of the frame R, in which the bottom die-plate, Q, is held, said die-plate is gradually raised, and thus the die-plates P and Q are gradually brought toward each other until the completion of the revolution of the cam-disk S, when the frame R drops and the die-plates P Q are separated. Every time the wheel E′, Fig. 2, completes a revolution the disk F′ on the same also completes a revolution, and the projection $F^2$ of the said wheel F′ strikes the arm $F^3$ of the shaft $F^4$ and turns said shaft $F^4$ in such a manner that the arm $F^5$ (shown in the vertical position in Fig. 2) is brought into a horizontal position, and, acting on the lower end of the pawl $E^4$, swings the upper end of said pawl $E^4$ from engagement with the ratchet-wheel $E^5$, and it is thus evident that during the time that the arm $F^5$ is in horizontal position the pawl $E^4$ cannot act on the teeth of said ratchet-wheel $E^5$, whereas during the greater part of the revolution of the wheel E′ the arm $F^5$ is in vertical position, thus permitting the engaging of the pawl $E^4$ with the ratchet-wheel $E^5$, so that by the vertical reciprocation of the frame D the ratchet-wheel $E^5$ is revolved. The motion of the ratchet-wheel $E^5$ is transmitted by the gear-wheels to the tubular shaft F, and from the same to the shaft G′ in the box G, Figs. 8 and 9, and from the shaft G′ to the several cog-wheels $G^3$, whereby the rods $G^5$ are turned on their longitudinal axes, as are also the heads $G^6$ on the ends of the same. The flanged ends of the blanks $a$, located between the dies P and Q, rest against the rubber disks $G^7$ of the heads $G^6$, and by the actions of the springs $J^3$, surrounding the sleeves $G^4$, through which the rods $G^5$ pass, said rubber disks $G^7$ are pressed firmly against the flanged ends of the blanks $a$. The rods $G^5$ are thus revolved, and rotate by frictional contact the blanks resting against the rubber disks $G^7$, and thus it is evident that the blanks are rotated during the greater part of the revolution of the wheel E′—that is, they are revolved as long as the arm $F^5$ is in vertical position and the pawl $E^4$ is engaged with the ratchet-wheel $E^5$. As soon as the projection $F^2$ of the wheel F′ acts on the arm $F^3$ of the shaft $F^4$, and the arm $F^5$ of the shaft $F^4$ is brought into horizontal position, the pawl $E^4$ is disengaged from the ratchet-wheel $E^5$, and consequently the rods $G^5$ come to a standstill and do not rotate the blanks $a$. This rotation of the blanks is necessary, so that they receive each stroke of the dies in a different position, as otherwise the metal of the blanks would not be drawn inward, but would be compressed or flattened. The blanks remain in one pair of dies during one entire revolution of the shaft E, which corresponds to as many blows from the die-plate P as there are teeth in the wheel E′. Every time the wheel E′ has made a revolution the blanks must be conveyed to the next pair of dies. This is accomplished in the following manner: As previously stated, the bar K is supported by the standards $K^5$. The bar L is supported by means of the pins $L^3$ from the plate M, resting on the frame R, and is pressed downward by the springs $K^4$. When the cam-disk S is in the position shown in Fig. 1, the frame R is not raised during the first part of the revolution of the said cam-disk, as the part of the cam between the offset $S^2$ and the shoulder $S^3$ is concentric to the center of the disk. As soon as the arm S′ has passed the shoulder $S^3$ the frame R is moved upward, and thus the upper bar, L, which is supported from the plate M on the frame R, is also moved upward, and so on, until the disk S has completed its revolution, when the frame R suddenly drops, and the bar L drops with the frame R and is pressed upon the flanges of the blanks, whereby said blanks are securely held between the bars L and K. If said bars L and K are now moved to the right the distance from one pair of dies to the next pair, the blanks will be conveyed with said bars and will be shifted from one pair of dies to the next pair. At the same time that the bar L is moved downward to grasp the blank in the manner described the end of the curved arm $N^6$ snaps off the projection or shoulder $I^5$ of the cam-disk $I^4$ on the shaft E, and the spring $N^3$ draws the bars K and L in the direction of the arrow $x'$, Fig. 5, whereby the arm $N^7$ on the shaft $N^8$ is moved in the direction of the arrow $x^2$, Fig. 4.

The die-plates P and Q are separated as the arm S′ of the frame R, which holds the lower die-plate, Q, has dropped off the offset $S^2$ of the cam-disk S the moment before the end of the curved arm $N^6$ slips off the highest point or offset, $I^5$, of the cam-disk $I^4$. After dropping off the offset $I^5$ of the cam-disk $I^4$ the end of the arm $N^6$ runs on the part $I^6$ of the rim of the disk $I^4$, and as that part $I^6$ is concentric the arms $N^6$ and $N^7$ on the shaft $N^8$ are not shifted. During the time that the end of the arm $N^6$ travels on the concentric part $I^6$ of the rim of the disk $I^4$, the frame R is gradually raised, and thereby the bar L is raised and the blanks released, said blanks being now held between the two dies. Then the eccentric part of the rim of the disk $I^4$ begins to act on the end of the arm $N^6$ of the shaft $N^8$, whereby said arm $N^6$ and the arm $N^7$ are moved in the inverse direction of the arrow $x^2$, Fig. 4, and the bars K L moved in the inverse direction of the arrow $x'$, Fig. 5, ready to shift the blanks again for the next rotation of the shaft E. The blanks are thus held loosely between the dies during the operation of drawing inward the metal; but at the end of each revolution of the shaft E the bar L descends upon the rims of the buttons in consequence of the lowering of the frame R. Then the bars K L are shifted in the manner set forth, and so on. During the time that the blanks or buttons are being shifted in the manner set forth it is necessary that the rubber disks $G^7$ on the heads $G^6$ should be withdrawn. At the same time that the blanks are grasped or held by the bar L the projection $I^3$ on the rim of the disk $I^4$ acts on the arm $I^2$ of the shaft $i$, whereby the arm I of the shaft is swung in the direction of the arrow $x^3$, Fig. 4, and acting on the pin $H^7$, projecting downward from the rod $H^6$, moves said rod $H^6$ in the direction of the arrow $x^4$, Fig. 9, whereby the arms $H^4$ are swung in the direction of the arrows $x^5$, Fig. 9, and the cam-arms $H^2$ swung inward, and acting on the bar H press the same toward the rear of the box, whereby the collars J are also pressed to the rear, and as said collars are connected with the sliding rods $G^5$ said rods and their heads $G^6$ are withdrawn from the ends of the blanks. After a short time the arm $I^2$ is disengaged from the projection $I^3$ of the disk $I^4$, and the springs $J^3$ expand and press the rubber disks $G^7$ against the blanks, and thus the blanks are revolved, as before described.

It is evident that the rods $G^5$ for turning the blanks must ascend and descend with the lower die-holder, and for this reason the box G is supported on the plate M, secured on the frame R. From the above it is apparent that for each stroke of the machine a finished button is thrown from between the die-plates at the right-hand end of the machine, and a fresh button must be introduced at the left-hand edge. The edge of the blank is placed in a recess in the bottom bar, K, and the upper part of the blank is pressed down by the arm $N^2$, Fig. 5. Said blank is then moved in between the die-plates in the manner previously described and gradually conveyed to the right-hand ends of the die-plates.

Having thus described my invention, I claim as new and desire to secure by Letters Patent—

1. In a machine for drawing in metal blanks, the combination, with reciprocating series of upper and lower dies, of automatic carriers for conveying the blanks all together and each severally from one pair of dies to the next succeeding pair of dies of said series, substantially as shown and described.

2. In a machine for drawing in metal blanks, the combination, with reciprocating series of upper and lower dies of different sizes, of rotators for rotating the blanks during the time that they are between the dies, substantially as shown and described.

3. In a machine for drawing in metal blanks, the combination, with the reciprocating series of upper and lower dies, of rotators for rotating the blanks during the time that they are being acted upon by the dies, and automatic carriers for shifting the blanks, substantially as described.

4. A machine for drawing in metal blanks, constructed with a reciprocating series of upper dies, a vertically-adjustable series of lower dies, and rotators for rotating the blanks held between the dies, substantially as shown and described.

5. A machine for drawing in metal blanks, constructed with a reciprocating series of upper dies, a series of lower dies mounted to move toward and from the reciprocating series of upper dies, blank-shifting bars mounted behind the dies to slide parallel with the fronts of the dies, and springs for pressing the upper bar downward, substantially as shown and described.

6. A machine for drawing in metal blanks, constructed with a reciprocating series of upper dies, a series of lower dies held in a frame mounted to slide toward and from the reciprocating series of upper dies, and a cam acting on the sliding die-holding frame, which cam is operated from the same shaft that operates the reciprocating upper dies, substantially as shown and described.

7. A machine for drawing in metal blanks, constructed with a reciprocating series of upper dies, a series of dies fixed on a frame mounted to slide toward and from the reciprocating series of upper dies, a shaft carrying a cam-disk operating the sliding die-holding frame, which shaft is operated from the same shaft that operates the reciprocating upper dies, and blank-shifting bars behind the dies and supported by the sliding frame carrying the lower dies, substantially as shown and described.

8. A machine for drawing in metal blanks, constructed with a reciprocating series of upper dies, a series of dies on a frame mounted to slide toward and from the reciprocating upper dies, a cam-disk for raising the sliding frame, a box supported by the frame, rotating shafts or rods in said box, power-transmitting gearing for rotating the rods in the box from the same shaft that operates the reciprocating upper dies, sliding blank-shifting bars in front of the box and behind the dies, and power-transmitting mechanism for operating the sliding bars from the shaft that operates the reciprocating series of dies, substantially as shown and described.

9. A machine for drawing in metal blanks, constructed with a reciprocating series of upper dies, a series of lower dies on a frame mounted to slide toward and from the reciprocating upper dies, a box supported by the sliding frame, rotating rods in said box, a shaft connected with power-transmitting gearing in the box, and a reciprocating frame and pawl for rotating said shaft, which reciprocating frame is operated from the same shaft that operates the above-mentioned reciprocating dies, substantially as shown and described.

10. In a machine for drawing in metal blanks, the combination, with a reciprocating series of upper dies, of a series of lower dies on a sliding frame, a cam-disk acting on said sliding frame, a shaft carrying said cam-disk, a ratchet-wheel on the opposite end of said shaft, and a reciprocating frame provided with a pawl engaging with said ratchet-wheel, which reciprocating frame is operated from the same shaft that operates the reciprocating dies, substantially as shown and described.

11. In a machine for drawing in metal blanks, the combination, with a reciprocating series of upper dies, of a series of lower dies on a vertically-sliding frame, a cam-disk acting on an arm of said vertically-sliding frame, a shaft on which the disk is mounted, a ratchet-wheel on the opposite end of the shaft, a reciprocating frame carrying a pawl engaging with the said ratchet-wheel, which reciprocating frame is operated from the same shaft that operates the reciprocating dies, a pawl on the frame, gearing operated from said pawl, a shaft connected with said gearing, a box supported on the sliding frame and containing gearing operated from the above-mentioned shaft, rotating rods in the box, and heads and rubber disks on said rotating rods, substantially as shown and described.

12. In a machine for drawing in metal blanks, the box G, combined with the sleeves $G^4$, having the cog-wheels $G^3$, the sliding rods $G^5$ in the sleeves $G^4$, the heads $G^6$ on the ends of said rods, and rubber disks $G^7$ on the said heads, substantially as shown and described.

13. In a machine for drawing in metal blanks, the combination, with dies, of a series of rotating rods held behind the dies, gearing for rotating the rods, springs for pressing the ends of the rods toward the dies, a bar against which the springs act, pivoted cam-arms against which said bar rests, and a sliding bar for operating said cam-arms, substantially as shown and described.

14. In a machine for drawing in metal blanks, the combination, with dies, of revolving heads behind the dies, and the sliding bars K L, provided with grooves and notches for receiving the edges of the flanges of the blanks, substantially as shown and described.

15. In a machine for drawing in metal blanks, the combination, with a reciprocating series of upper dies and a series of lower dies mounted on a vertically-sliding frame, of a cam-disk operating the sliding frame, a shaft on which the cam-disk is mounted, which shaft is operated from the same shaft that operates the reciprocating upper dies, sliding blank-shifting bars behind the dies, a spring acting on said bars, and a shaft having arms, one of which acts on the sliding bars and the other is acted upon by a cam-disk on the same shaft that carries the disk for operating the sliding frame holding the lower dies, substantially as shown and described.

16. In a machine for drawing in metal blanks, the combination, with a reciprocating series of upper dies and a series of lower dies on a vertically-sliding frame, of the bar L, supported by pins $L^3$ from the vertically-sliding frame, the bar K, supported in suitable standards, the pins $K^3$, projecting from the bar K up through apertures, and springs surrounding the pins $K^3$, substantially as shown and described.

17. In a machine for drawing in metal blanks, the combination, with dies and the sliding bars K L, of the arm $N^2$, mounted to slide vertically on the standard $N^3$ at one end of the dies, substantially as shown and described.

18. In a machine for drawing in metal blanks, the combination, with dies, of a series of blank-rotators behind the dies, gearing for rotating the blank-rotators, a reciprocating frame operated from the same shaft that operates the dies, a pawl for operating the blank-rotating gear from the said reciprocating frame, a disk on said shaft, and a shaft, $F^4$, provided with arms $F^3$ and $F^5$, for adjustment of the pawl that operates the blank-rotator mechanism from the reciprocating frame, substantially as shown and described.

19. In a machine for drawing in metal blanks, the combination, with a reciprocating series of upper dies and a series of lower dies on a sliding frame, of a cam operating the bottom sliding die-holding frame, a shaft on which the cam is mounted, power-transmitting gearing operated from the shaft that operates the reciprocating upper dies, blank-shifter bars behind the dies, mechanism for operating said blank-shifter bars from the shaft carrying the die for moving the sliding frame, blank-rotators, mechanism for operating the blank-rotators from the shaft that operates the reciprocating upper die, and mechanism for withdrawing the blank-rotators, which mechanism is operated from a disk on the shaft carrying the cam-disk that operates the sliding bottom die-holder, substantially as shown and described.

In testimony that I claim the foregoing as my invention I have signed my name in presence of two subscribing witnesses.

GEO. KREMENTZ.

Witnesses:
HENRY F. GOKEN,
A. VAN ARSDALE.